(12) United States Patent
Feldtkeller

(10) Patent No.: US 7,696,794 B2
(45) Date of Patent: Apr. 13, 2010

(54) DRIVE CIRCUIT FOR A SWITCH IN A SWITCHING CONVERTER

(75) Inventor: Martin Feldtkeller, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/861,313

(22) Filed: Jun. 4, 2004

(65) Prior Publication Data
US 2005/0017764 A1    Jan. 27, 2005

(30) Foreign Application Priority Data
Jun. 5, 2003    (DE) ................ 103 25 519

(51) Int. Cl.
    *H03K 4/06*    (2006.01)
(52) U.S. Cl. ........................ 327/137; 326/80
(58) Field of Classification Search ........... 327/131, 327/134, 136, 137, 140; 326/80, 333; 363/21.04
See application file for complete search history.

(56) References Cited

U.S. PATENT DOCUMENTS

| | | | | |
|---|---|---|---|---|
| 4,386,311 A | * | 5/1983 | Bafaro | 323/271 |
| 4,623,960 A | * | 11/1986 | Eng | 363/21.08 |
| 4,837,452 A | * | 6/1989 | Peterson | 307/2 |
| 5,083,254 A | * | 1/1992 | Feldtkeller | 363/49 |
| 5,101,120 A | * | 3/1992 | Bonges et al. | 326/84 |
| 5,313,381 A | * | 5/1994 | Balakrishnan | 363/147 |
| 5,335,162 A | * | 8/1994 | Martin-Lopez et al. | 363/97 |
| 5,631,810 A | * | 5/1997 | Takano | 363/21.05 |
| 5,748,461 A | * | 5/1998 | Preller | 363/97 |
| 5,862,045 A | * | 1/1999 | Halamik et al. | 363/97 |
| 5,903,452 A | * | 5/1999 | Yang | 363/97 |
| 5,940,281 A | * | 8/1999 | Wolf | 363/21.08 |
| 6,134,123 A | * | 10/2000 | Yamada | 363/21.13 |
| 6,137,702 A | * | 10/2000 | Hall et al. | 363/95 |
| 6,198,265 B1 | * | 3/2001 | Stevenson | 323/288 |
| 6,201,417 B1 | * | 3/2001 | Blum et al. | 327/14 |
| 6,285,569 B1 | * | 9/2001 | Hall et al. | 363/21.15 |

(Continued)

FOREIGN PATENT DOCUMENTS

EP    0 585 789 B1    8/1995

OTHER PUBLICATIONS

Köstner, R. and A., Möschwitzer, "Elektronische Schaltungen", Carl Hanser Verlag München Wien, 1993, pp. 286-289 (4 pages).

(Continued)

*Primary Examiner*—Lincoln Donovan
*Assistant Examiner*—Thomas J Hiltunen
(74) *Attorney, Agent, or Firm*—Maginot, Moore & Beck

(57) ABSTRACT

The invention relates to a drive circuit for providing a drive signal (S3) for a switch in a switching converter in a manner dependent on a control signal (S2), the drive circuit comprising at least two groups (22, 30) of circuit components, each group having at least one circuit component, and the circuit components being coupled to one another and designed to provide the drive signal (S3) from the control signal (S2). In this case, voltage is supplied to the circuit components of the first group by means of the control signal, while voltage is supplied to the circuit components of the second group (30) by means of a supply voltage at a supply terminal (K2).

8 Claims, 6 Drawing Sheets

U.S. PATENT DOCUMENTS

| | | | |
|---|---|---|---|
| 6,366,070 B1 * | 4/2002 | Cooke et al. | 323/284 |
| 6,429,709 B1 * | 8/2002 | Hall et al. | 327/175 |
| 6,768,655 B1 * | 7/2004 | Yang et al. | 363/21.01 |
| 6,903,945 B2 * | 6/2005 | Kitano | 363/21.01 |
| 2001/0036089 A1 * | 11/2001 | Gattavari et al. | 363/21.01 |
| 2002/0021150 A1 * | 2/2002 | Tuchiya et al. | 327/108 |
| 2003/0006829 A1 * | 1/2003 | Alessandria et al. | 327/538 |
| 2003/0052661 A1 * | 3/2003 | Tachimori | 323/313 |

OTHER PUBLICATIONS

"Regulating Pulse Width Modulator", Linfinity Microelectronics Inc, Garden Grove, CA, © 1994, (6 pages).

"Off-Line SMPS Current Mode Controller", Infineon Technologies AG, München, Germany, Datasheeet Version 3.0, Feb. 2002, (24 pages).

TDA16850:SMPS Controller for CRT Monitors-Preliminary Data, Aug. 14, 1998, 1-21, Siemens.

* cited by examiner

FIG 1  Stand der Technik

DRIVE CIRCUIT FOR A SWITCH IN A SWITCHING CONVERTER

FIELD OF THE INVENTION

The present invention relates to a drive circuit for a switch in a switching converter.

BACKGROUND

Many electronic devices, for example computer peripherals, notebooks, portable devices appertaining to entertainment electronics or musical instruments do not have a built-in power supply unit, but rather are supplied with a low-voltage DC voltage via an adapter. Although the device itself usually has an on/off switch, the latter is situated downstream of the power supply unit, so that, even when the load is switched off, current is taken by the power supply unit as long as this is connected to the electrical network.

At the present time, legislators are endeavoring to reduce the current consumption of such power supply units in the standby mode, that is to say when the load is switched off, from at the present time about 2 W to 0.5 W and then further to 0.1 W, which makes considerable requirements of the control circuits used in the power supply units since, even in the standby mode, the power supply unit is intended to output a regulated output voltage and, in particular, is intended to be able to momentarily output sufficient power after the load is switched off.

In order to provide drive signals for a switch in a switched-mode power supply, a control signal dependent on the output voltage provided is fed to the drive circuit. In the case of flyback converter switched-mode power supplies, in which the switch is connected in series with the primary coil of a transformer and in which output terminals for providing the output voltage are coupled to the secondary winding of the transformer, the feedback of the control signal on the secondary side to the drive circuit arranged on the primary side necessitates potential isolation, which is usually ensured by means of an optocoupler. It is precisely when a connected load has a low power consumption that such optocouplers contribute considerably to the power consumption of the switched-mode power supply and thus to the power loss, as is explained briefly below with reference to a switched-mode power supply according to the prior art.

FIG. 1 shows an example of a conventional flyback converter switched-mode power supply which is described for example in Köstner/Möschwitzer: "Elektronische Schaltungen" [Electronic circuits], Karl Hanser Verlag Munich, 1993, pages 286 to 288.

The power supply unit houses input terminals EK1, EK2 for applying a power supply voltage Un, and a rectifier arrangement—coupled to the input terminals EK1, EK2 with a bridge rectifier BG and an input capacitor Cin, across which a rectified voltage Uin is present. In order to convert said rectified input voltage Uin into a regulated output voltage Uout available at output terminals AK1, AK2, a converter with a transformer TR is available, in the primary coil Lp of which is connected in series with a switch T formed as a semiconductor switch, the input voltage Uin being present across this series circuit. A secondary coil Ls of the transformer TR is inductively coupled to the primary coil Lp, said secondary coil Ls being connected to the output terminals AK1, AK2 via a rectifier arrangement D1, C2. The power consumption of this power supply unit and thus the output voltage Uout are dependent on the duty ratio of a drive signal S3 which comprises a sequence of drive pulses and drives the semiconductor switch T. In the case of a fixedly clocked switched-mode power supply, in which the switch T is closed at regular time intervals, the power consumption rises as the duty cycle rises, the duty cycle representing the ratio between switch-on duration of the semiconductor switch T and the drive periods determined by the interval between two switch-on instants.

The drive signal S3 is made available by a drive circuit 12, to which a control signal S2 dependent on the output voltage Uout is fed. In order to generate the control signal, a controller 10 is provided on the secondary side, which controller is connected to the output terminals AK1, AK2 and provides a control signal S1, which is transmitted to the primary side by means of an optocoupler 11. In this case, the control signal S1 on the secondary side and the control signal S2 on the primary side are ideally proportional to one another. The controller 10 has for example an integral action (I controller) or a proportional-integral action (PI controller)

Owing to the relatively simple interconnection of the controller, it is customary to operate the optocoupler 11 with a negative control sense, i.e. to generate a control signal S1 or S2 which is all the greater, the lower the power that is to be output to the output terminals AK1, AK2. In the standby mode, that is to say in the case of an open circuit at the output terminals AK1, AK2 or when a load Z illustrated by dashed lines in FIG. 1 has only a very low power consumption, the control signal S1 is thus particularly large and the current consumption of the optocoupler 11 is thus particularly high.

For the voltage supply of the drive circuit 12, a supply voltage Vcc is generated internally, said supply voltage being provided for example by an auxiliary coil (not specifically illustrated) coupled to the primary coil Lp with a rectifier circuit connected downstream, as is described for example in Köstner/Möschwitzer, loc. cit. In this case, the supply voltage Vcc must be large enough to be able to ensure driving of the semiconductor switch T even in the standby mode. A reduction of the supply voltage Vcc, which would also result in a reduction of the power loss of the optocoupler 11, is thereby limited.

A known drive circuit for driving the semiconductor switch in a switched-mode power supply is a drive circuit of the ICE2AS01 type, from the Applicant. A switched-mode power supply in accordance with FIG. 1 is likewise elucidated in the data sheet of this drive circuit. In the case of this drive circuit, the maximum optocoupler current is about 1.5 mA, which, given an internally generated supply voltage Vcc of 15 V, results in a power loss brought about by the optocoupler of 22.5 mW.

The Applicant's control circuit of the TDA 16850 type uses control with a positive control sense, so that, when a load has a low power consumption, a small control signal is transmitted to the drive circuit via the optocoupler. However, this is associated with higher complexity of the circuit, in particular of the controller 10.

EP 0 585 789 B1 discloses using the optocoupler current of the control loop for the current supply of the control circuit in order thereby to reduce the number of terminals of the drive circuit and to be able to accommodate the circuit in a cost-effective TO-220 housing with just three terminal pins. In the case of this circuit, however, the optocoupler must be dimensioned such that a current sufficient for supplying the control circuit always flows through said optocoupler. In the case of a negative control sense, the optocoupler current in the standby mode is in this case a multiple of the current consumption required for the control circuit. A low standby power consumption is thus not possible in the case of this circuit.

It is an aim of the present invention to provide a drive circuit for a switch in a switched-mode power supply which has a low power consumption in the standby mode.

SUMMARY

This object is achieved by embodiments of the present invention.

The invention's drive circuit for providing a drive signal for a switch in a switching converter in a manner dependent on a control signal comprises a first input terminal for feeding in the control signal, a supply terminal for applying a supply voltage and an output terminal for providing the drive signal. The drive circuit furthermore comprises circuit components which are coupled to one another and designed to provide the drive signal from the control signal. Said circuit components are subdivided into at least two groups, each group being assigned at least one circuit component. In this case, voltage is supplied to the circuit components of the first group via the first input terminal, and thus by the control signal—usually made available by an optocoupler. Voltage is supplied to the circuit components of the second group via the supply terminal to which a supply voltage can be applied.

The circuit components are assigned to the first or second group preferably in a manner dependent on the supply voltage which is required by the individual circuit components. In this case, the circuit components which require a low supply voltage are assigned to the first group, and are thus supplied by means of the control signal while the circuit components which require a larger supply voltage are assigned to the second group, and are thus supplied via the supply terminal of the drive circuit.

The drive circuit according to the invention uses the control signal in a conventional manner for setting the duty cycle of the drive signal to be generated. Furthermore, the control signal is used for the voltage supply of selected circuit components which require a lower supply voltage. Since circuit components which require a higher supply voltage are supplied via the supply terminal, and thus not by means of the control signal, in contrast to conventional switched-mode power supplies, it is not necessary to amplify the control signal for the purpose of supplying voltage to the drive circuit. Owing to the control signal being used simultaneously as an information carrier and as a voltage supply signal, the power consumption of the drive circuit according to the invention is reduced compared with conventional drive circuits.

The circuit components of the drive circuit are assigned to the first or second group in a manner dependent on the required supply voltage or in a manner dependent on the current or power consumption of said circuit components, and the assignment is independent of the purpose which is fulfilled by the individual circuit components. The concept according to the invention can be applied to arbitrary conventional drive circuits for which purpose the circuit components of the drive circuit are subdivided into at least two groups in accordance with their required supply voltage or their current consumption, and for which purpose the components having a low required supply voltage or a low power consumption are supplied by means of the control signal and the remaining components are supplied via the supply terminal of the drive circuit.

Circuit components which are assigned for example to the first group of circuit components, supplied by the control signal are analog circuit components, such as, for example, reference voltage generators, signal generators, comparators, operational amplifiers or voltage dividers, the required supply voltages of which are usually in the region of about 5 V.

Circuit components assigned to the second group, and which are thus supplied via the supply terminal with an external supply voltage, are for example digital circuit components such as flip-flop or logic gates, and in particular driver circuits which serve to provide two-valued logic signals at suitable drive levels for driving the switch in the switched-mode power supply. Such driver circuits usually require a supply voltage of more than 10 V. Therefore, the digital circuit components are preferably supplied via the supply terminal because they have a pulsed current consumption which, in the event of supply by means of the control signal would lead to disturbances in the control signal.

Preferably, a first voltage regulator is present, which is coupled between the supply terminal and the input terminal and in parallel with the control signal ensures a voltage supply of the circuit components of the first group, this first voltage regulator being designed to ensure a basic supply of the circuit components. By way of example, if the control signal is so small that a sufficient voltage supply of the components of the first group is not ensured by means of the control signal, then the first voltage regulator undertakes part of the supply of said components. The proportion of the supply of said components of the first group which is undertaken by the first voltage regulator decreases as the control signal increases. Owing to the first voltage regulator, which ensures a supply of the circuit components even when the control signal is small, it is possible, in the case of the circuit according to the invention, to dispense with choosing the dimensioning of the control signal—which is usually supplied by an optocoupler—in a manner dependent on the power consumption of the circuit components of the first group.

The first voltage regulator is designed for example as a zener diode connected between the supply terminal and a voltage supply node, the first input terminal with the control signal likewise being coupled to said voltage supply node via which the components of the first group are supplied.

A second voltage regulator is advantageously available, which provides a regulated supply voltage for the circuit components of the first group from a voltage that is present at the first voltage supply node and is provided by the control signal and the first voltage regulator.

The circuit components of the second group may be connected directly into the supply terminal of the drive circuit and/or the circuit components of the second group may be assigned a third voltage regulator, which provides a regulated voltage from a supply voltage present at the supply terminal in order to supply individual or all circuit components of the second group with a regulated supply voltage.

Inter alia, the costs for the housing of the drive circuit which surrounds the integrated circuit components make a not inconsiderable contribution to the costs in the production of a switched-mode power supply. It holds true in this case that the housing costs are lower, the fewer terminals the housing has. In order, on the one hand, to reduce the number of external terminals required in the case of the switched-mode power supply according to the invention but, on the other hand to provide an interface toward the outside in order to be able externally to tap off information about the switched-mode power supply, one embodiment provides for the first voltage regulator to be of adjustable design, so that it provides at least two different supply voltages in a manner dependent on a setting signal. Since the first voltage regulator is coupled between the supply terminal and the input terminal, it is possible, between the supply terminal and the input terminal, to determine externally, by tapping off the voltage between said terminals, what supply voltage the first voltage regulator is currently supplying. A change in the supply voltage of the first voltage regulator is noncritical with regard to the function of the circuit components of the first group if a second voltage regulator is available between the first voltage regulator and said circuit components, which second voltage regulator, over a certain voltage range of the supply voltage provided by the first voltage regulator, is able to provide a regulated supply voltage for the circuit components of the first group.

The setting signal which sets the voltage provided by the first voltage regulator for the voltage present across the voltage regulator is preferably a state signal which is generated in the drive circuit and specifies whether the power supply unit is in a normal mode or in the standby mode.

A further embodiment provides for the input terminal to be used as an input interface for a test mode of the switched-mode power supply. In the case of this embodiment, the drive circuit contains a test module coupled to the input terminal and to individual circuit components or groups of circuit components in the drive circuit. Said test module receives test data via the input interface for testing the circuit components present in the drive circuit. Information about the test results can be output in the manner explained previously in that the first voltage regulator supplies a first and a second supply voltage in a manner dependent on a preferably binary signal to be output, it being possible for the binary signal that is to be output to be determined between the supply terminal and the input terminal from the profile of the voltage present between said terminals.

BRIEF DESCRIPTION OF THE DRAWINGS

The present invention is explained in more detail below using exemplary embodiments with reference to figures, in which.

DETAILED DESCRIPTION

In the figures, unless specified otherwise, identical reference symbols designate identical parts with the same meaning.

Figure 1:
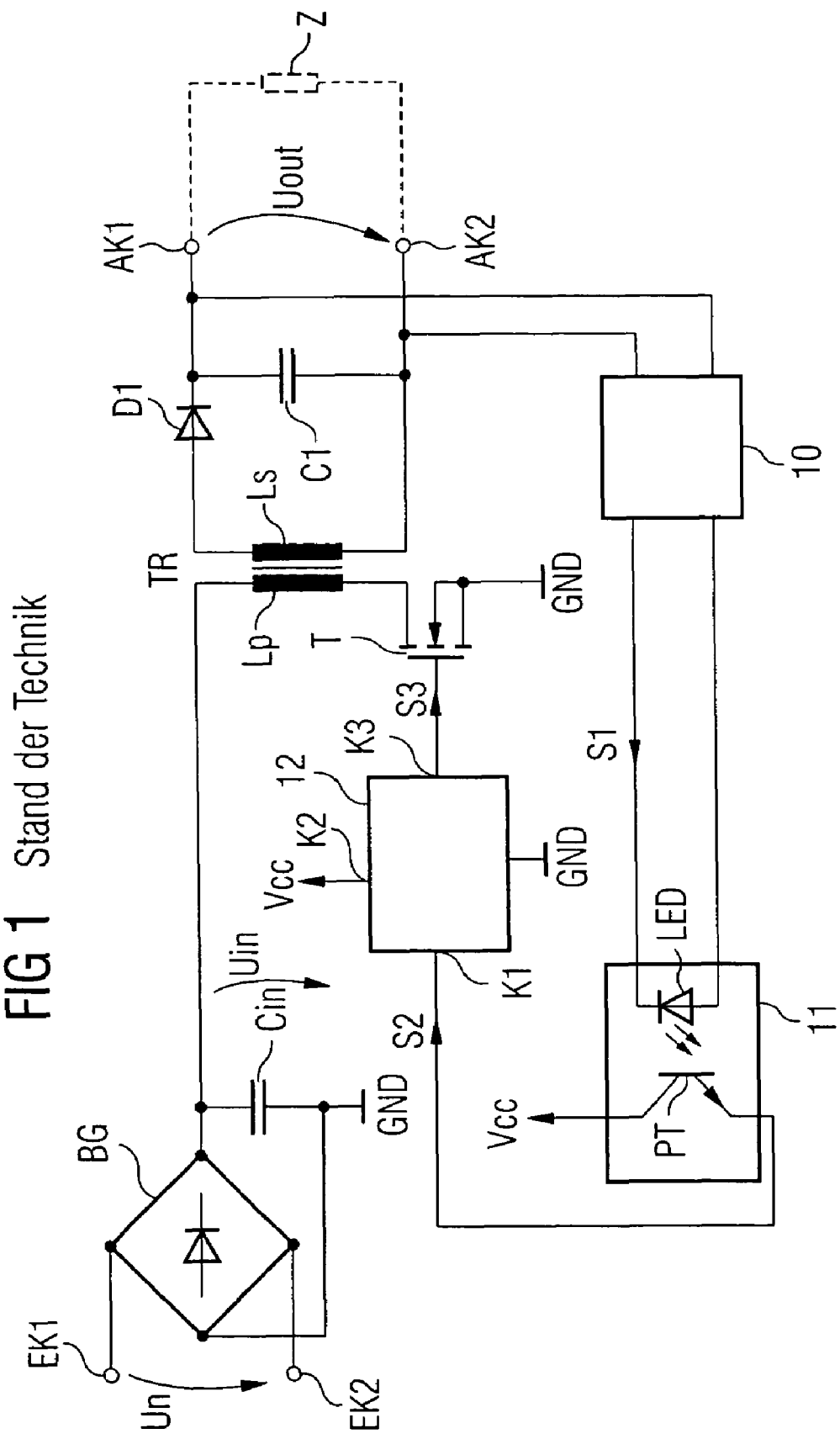
FIG. 1 shows a switched-mode power supply according to the prior art.
Figure 2:
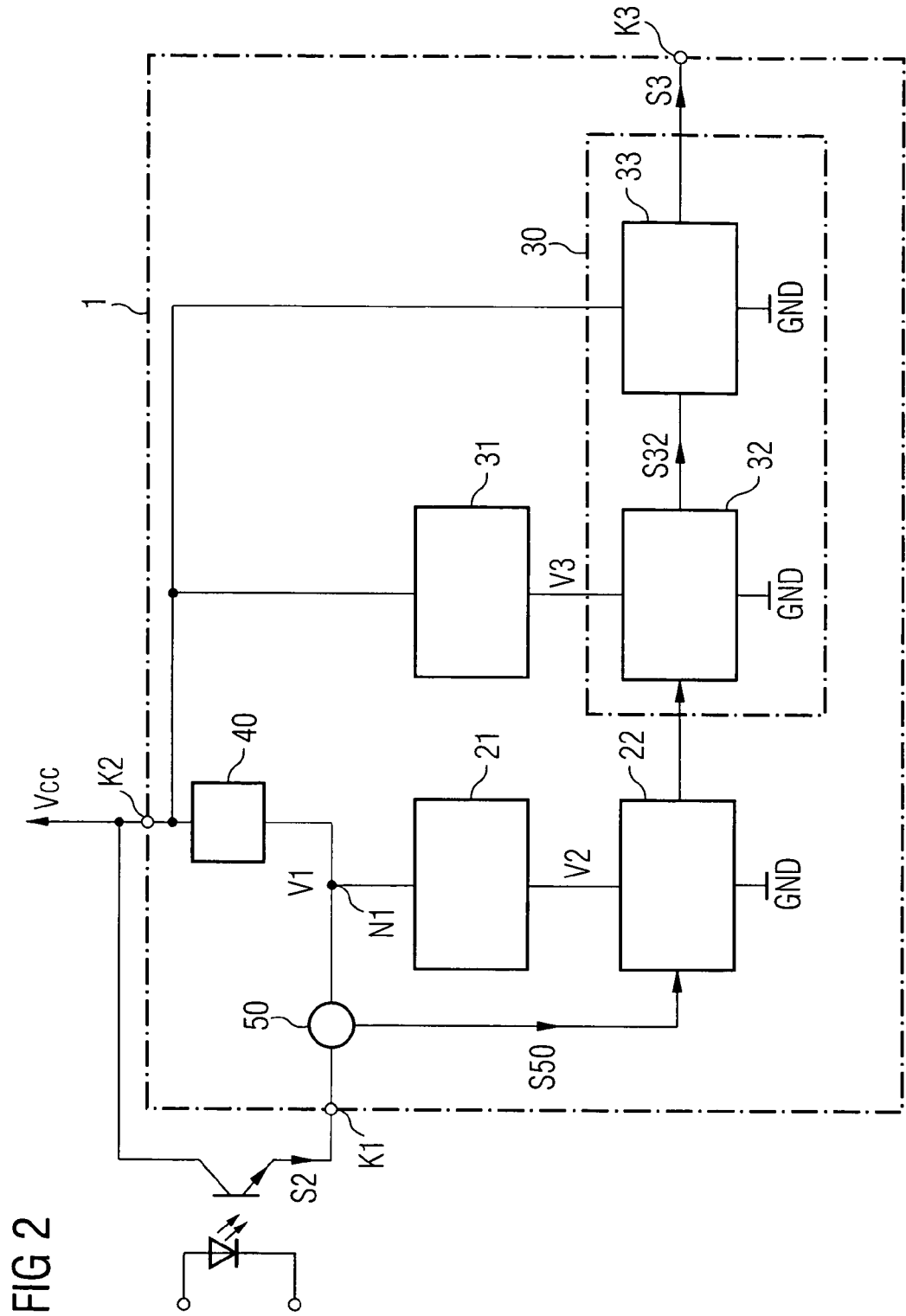
FIG. 2 shows a first exemplary embodiment of a drive circuit according to the invention for a switch in a switched-mode power supply, which drive circuit comprises a plurality of groups of circuit components.

FIG. 2 schematically shows a first exemplary embodiment of a drive circuit according to the invention in a switched-mode power supply, in which case, for a better understanding of the use of such a drive circuit in a switched-mode power supply, input and output terminals and also input and output signals of the drive circuit in accordance with FIG. 2 are designated in a manner corresponding to the input and output terminals and input and output signals of the drive circuit 12 in accordance with FIG. 1.

The drive circuit according to the invention comprises an input terminal K1 for feeding in a control signal S2, which is dependent on an output voltage of the power supply unit and is supplied for example by an optocoupler 11, as is illustrated by way of example in FIG. 2. The drive circuit furthermore comprises an output terminal K3, for providing a drive signal S3 for a switch in the switching converter or switched-mode power supply. The drive circuit furthermore comprises a supply terminal K2 for applying an external supply voltage Vcc, which can be generated in an arbitrary conventional manner in a switched-mode power supply.

The drive circuit contains two groups of circuit components, which are illustrated schematically in FIG. 2 by blocks bearing the reference symbols 22 and 30. Said circuit components are coupled to one another and designed to provide the drive signal S3 from a control signal S50 derived from the control signal S2. The connection which is illustrated in FIG. 2 between the circuit groups 22, 30 merely schematically illustrates the coupling of the circuit components assigned to the individual circuit groups 22, 30. Individual circuit components are assigned to the groups 22, 30 independently of their function in the drive circuit, but rather depending on their current consumption and/or required supply voltage. The current or voltage supply of the circuit components of the second group 30 is effected exclusively by means of the supply voltage Vcc present at the supply terminal K2. By contrast, voltage is supplied to the circuit components of the first group 22 by means of the control signal S2 present at the input terminal K1. the voltage supply of said circuit components of the first group 22 is preferably effected in parallel with the voltage supply by means of the control signal S2 via the supply terminal K2. For this purpose, a first voltage regulator 40 is present, which is connected between the supply terminal K2 and an internal voltage supply node N1 and provides sufficient power in order to compensate for a difference between the power obtained by means of the control signal S2 and the actual power consumption of the circuit components of the second group 22.

The first input terminal K1 is likewise coupled to the internal voltage supply node N1, at which a supply vol-voltage V1 supplied by the control signal S2 and by the first voltage regulator 40 is available. In the exemplary embodiment, the input terminal K1 is coupled to the internal voltage supply node N1 via a current measuring arrangement 50, the current measuring arrangement 50 serving to provide the internal control signal S50 which is preferably proportional to the control signal S2. The current measuring arrangement 50 may be realized in a sufficiently known manner for example by means of a current mirror arrangement.

In the exemplary embodiment, a second voltage regulator 21 is connected to the internal voltage supply node N1 and provides, from the supply voltage V1, a regulated supply voltage V2 for supplying voltage to the circuit components of the second group 22.

In the exemplary embodiment, the second group of circuit components 30 is assigned a third voltage regulator 31, which is connected to the supply terminal K2 and provides a regulated supply voltage V3 for some of the circuit components of the second group 30, which are jointly designated by the reference symbol 32 in FIG. 2. Other circuit components of said second group 30, which are jointly designated by the reference symbol 33, are directly connected to the supply terminal K2. The circuit components which are directly connected to the supply terminal K2 comprise for example a driver circuit serving to convert a logic signal S32, which is generated in the drive circuit and according to which the switch (reference symbol T in FIG. 1) is to be closed and opened, to a potential suitable for driving the switch, for example a MOSFET.

Figure 7:
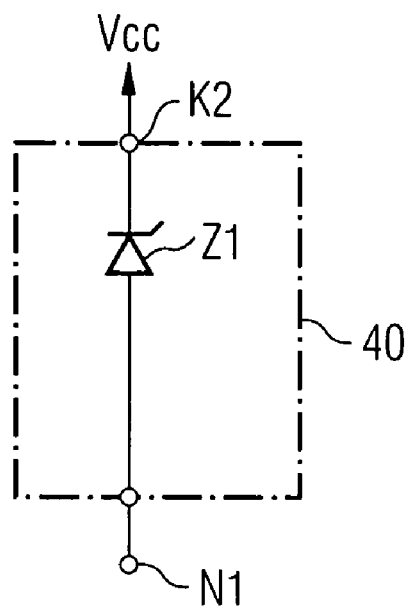
FIG. 7 shows an exemplary embodiment of a first voltage regulator of the drive circuit.

Referring to FIG. 7, the first voltage regulator 40 comprises a zener diode Z1, for example, which is connected in the reverse direction between the supply terminal K2 and the voltage supply node N1. Such a first voltage regulator 40 ensures that the supply potential V1 at the supply node N1 does not fall below a value which is less than the difference between the supply voltage Vcc applied externally to the supply terminal K2 and the breakdown voltage of the zener diode Z1. In this case, this minimum supply voltage V1 is chosen in such a way as to ensure a sufficient voltage supply of the circuit components of the first group 22.

In the case of a switched-mode power supply having a control loop with a negative control sense, voltage is supplied to the circuit components of the first group 22 as follows:

In the case of a control loop with a negative control sense, the control signal S2 rises as the power consumption of a load supplied by the switched-mode power supply decreases, and reaches its largest value in the standby mode. Assuming that the circuit components of the second group 22 have an approximately constant power consumption independently of the operating state of the drive circuit, the control signal S2 contributes to the voltage supply of said circuit components to a greater extent in the standby mode than in the normal mode when a connected load has a high power consumption, if the control signal S2 is correspondingly small. Depending on the value of the control signal S2 supplied by the optocoupler 11 and the power consumption of the circuit components of the first group 22, the control signal S2 may be sufficient in the standby mode to ensure the entire voltage supply of the circuit components of the first group 22. If, as the control signal S2 decreases, the supply voltage V1 falls below the above-explained minimum value dependent on the supply voltage Vcc and the breakdown voltage of the zener diode Z1, then the voltage supply of said circuit components of the second group 22 is increasingly ensured by the first voltage regulator 40 and thus via the supply terminal K2.

In the case of the drive circuit in accordance with figure 2, the control signal S2 is utilized completely for the voltage supply of circuit components 22 of the drive circuit, but said control signal S2 does not have to be adapted to the required power consumption of said circuit components 22 since the difference between the power supplied by the control signal S2 and the power actually required by the circuit components 22 is provided by the first voltage regulator 40.

As already explained, the circuit components of the first group 22 are preferably those circuit components which have an at least approximately constant power consumption independently of the operating state of the switched-mode power supply. Such circuit components are for example the analog circuit components found in any switched-mode power supply drive circuit, such as reference voltage generators, operational amplifiers, comparators or voltage dividers. The circuit components of the second group 30 are preferably digital circuit components or circuit components having a pulsed current consumption, such as, for example, the driver circuit 33 already explained. The power consumption of said circuit components of the second group 30 is also dependent on the operating state of the switched-mode power supply. Thus, it is sufficiently known, in the standby mode, to operate switched-mode power supplies in the so-called "burst mode" in which a plurality of successive drive pulses are generated in a manner spaced apart by switching pauses. A voltage supply of the circuit components of the second group 30 by means of the control signal S2 is disadvantageous if only because the pulsed current or power consumption of said circuit components would corrupt the incoming control signal S2 for the further evaluation, this not being the case for the circuit components of the first group 22, which have an approximately constant power or current consumption.

The concept according to the invention can be applied to arbitrary drive circuits for switched-mode power supplies in that the circuit components present in the drive circuit are subdivided according to their required voltage supply and current consumption characteristic and in that circuit components having an approximately constant power or current consumption are assigned to the first group 22 and are thus supplied by means of the control signal S2 and the first voltage regulator 40 and circuit components having a pulsed power or current consumption are supplied by means of the supply voltage Vcc.

The subdivision of the circuit components of a switched-mode power supply drive circuit into circuit components of the first group 22 and circuit components of the second group 30 is elucidated below in FIG. 3 on the basis of a simple exemplary embodiment of a drive circuit.

Figure 4:
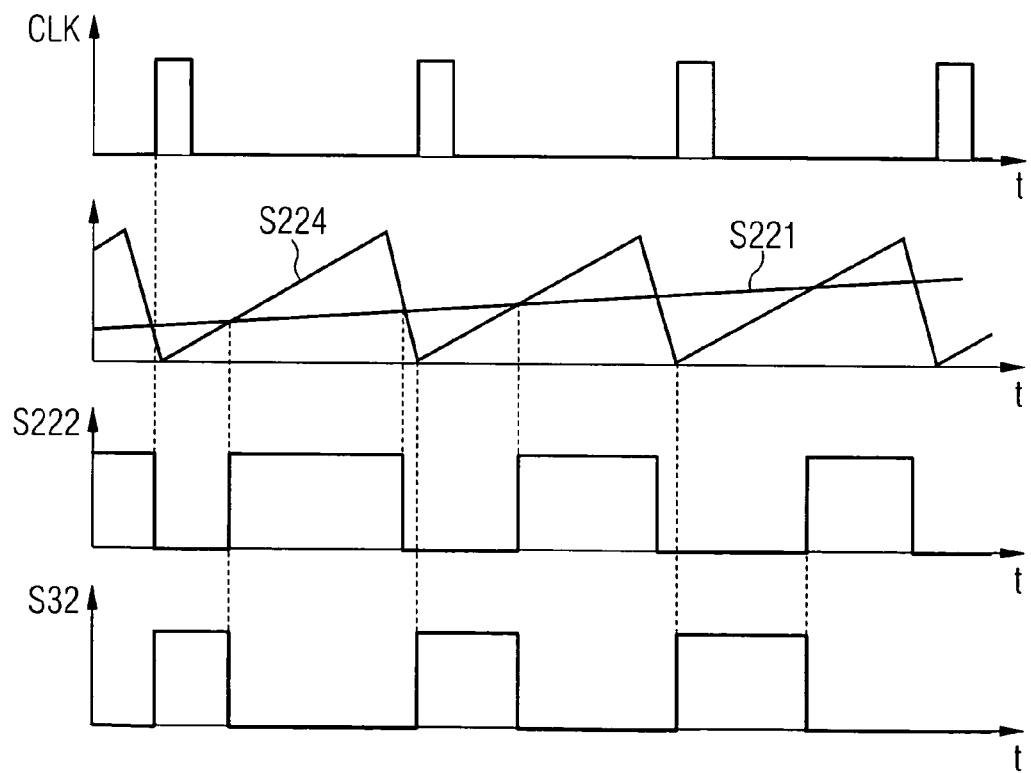
FIG. 4 shows exemplary temporal profiles of selected signals occurring in the circuit in accordance with FIG. 3.

In the exemplary embodiment, the circuit components of the first group 22 comprise analog circuit components, namely a voltage divider 225, a reference voltage source 220, an operational amplifier 221, a clock generator 223, a sawtooth generator 224 and a comparator 222. The internal control signal S50 is fed to the voltage divider 225, a signal S225 divided down by the voltage divider being subtracted, by means of an operational amplifier 221, from a reference signal Vref provided by the reference voltage source 220 in order to make a control signal S222 available. The clock signal generator 223 provides a clock signal CLK, according to which the sawtooth generator 224 generates a sawtooth signal S224, which is fed to one input of the comparator 222. The control signal present from the output of the operational amplifier 221 is fed to the other input of the comparator 222. As is illustrated in FIG. 4, the sawtooth generator 224 generates a sawtooth signal S224 in time with the clock signal CLK. The control signal S221 is dependent on the internal control signal S50, in which case it holds true that said control signal S221 is smaller the larger the control signal S50.

In the exemplary embodiment, the circuit components of the second group 30 comprise an RS flip-flop 320, to whose set input S the clock signal CLK is fed and to whose reset input R the comparator output signal S222 is fed. The flip-flop S is set with each clock of the clock signal CLK and is reset if the sawtooth signal S224 has risen to the value of the control signal S221. In the case of a control loop with a negative control sense, the control signal S50 rises, as the power consumption of a load connected to the power supply unit decreases, and reaches its maximum value upon open circuit of the load. In contrast, the control signal S221 decreases as the power consumption of said load decreases, as a result of which the duration of the drive pulses of the pulse-width-modulated signal S32 provided by the flip-flop 320 decreases as the power consumption of the load decreases, in order thereby to regulate the output voltage (Uout in FIG. 1) to a constant value. The dependence of the duration of said drive pulses on the control signal S221 is illustrated in FIG. 4, in which case, in FIG. 4, for illustration purposes, the control signal S221 rises continuously, from which it is evident that a shorter drive pulse results in the case of a small control signal S221 than in the case of a larger control signal 221.

The sawtooth signal can also be generated in a sufficiently known manner in that a current sensing resistor is connected in series with the switch (T in FIG. 1), a voltage across said current sensing resistor being fed to the drive circuit. However, this embodiment requires an additional connecting terminal of the drive circuit.

Figure 3:
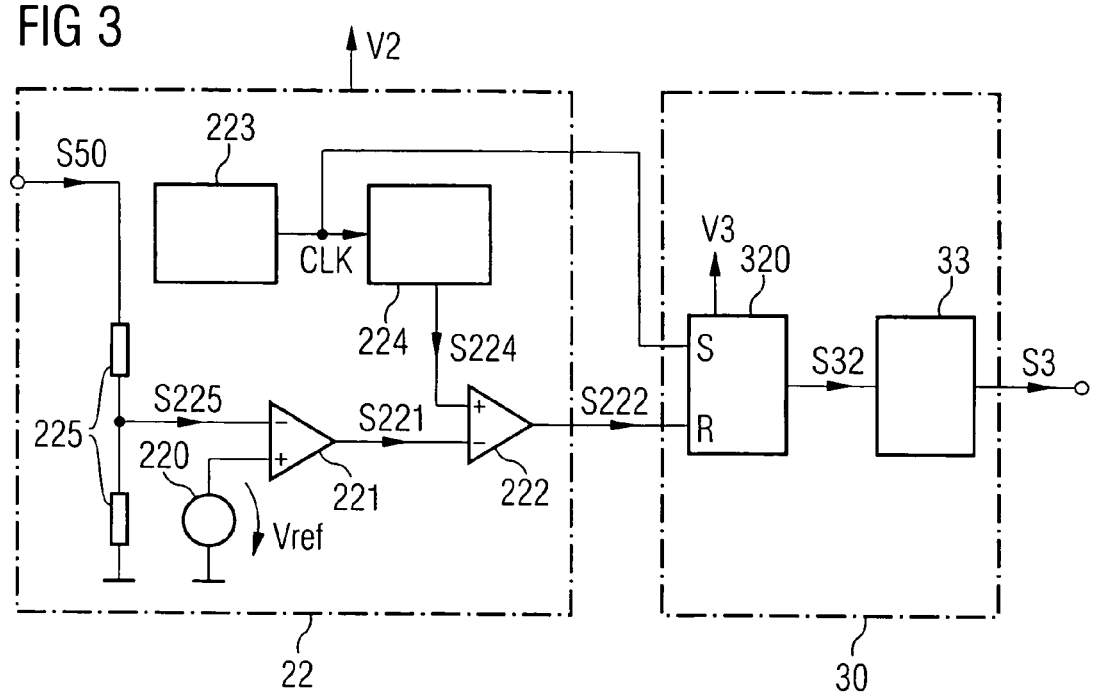
FIG. 3 shows an exemplary embodiment of an internal interconnection of circuit components of a first and a second group in the drive circuit.

It should be pointed out that the circuit components of the first group 22 are supplied by the supply voltage V2 provided by the second voltage regulator 21 in accordance with FIG. 2 even though the supply terminals of said components are not explicitly illustrated in this FIG. 3 for reasons of clarity. From the circuit components of the second group 30, the flip-flop 320, for example, is supplied by the supply voltage V3 provided by the voltage regulator 31 in accordance with FIG. 2, while the driver 33 that converts the logic signal S32 into a suitable drive signal S3 is supplied directly by the supply voltage Vcc.

The subcircuits of the drive circuit which are illustrated in FIG. 3 represent only a simple exemplary embodiment of a drive circuit in order to enable the subdivision of the circuit components of such a drive circuit into at least two groups 22, 30 to be better understood. An illustration of circuit components which, in the standby mode, for example generate drive signals in the so-called burst mode has thus been dispensed with, for example, even though such circuit components may, of course, be present.

Figure 5:
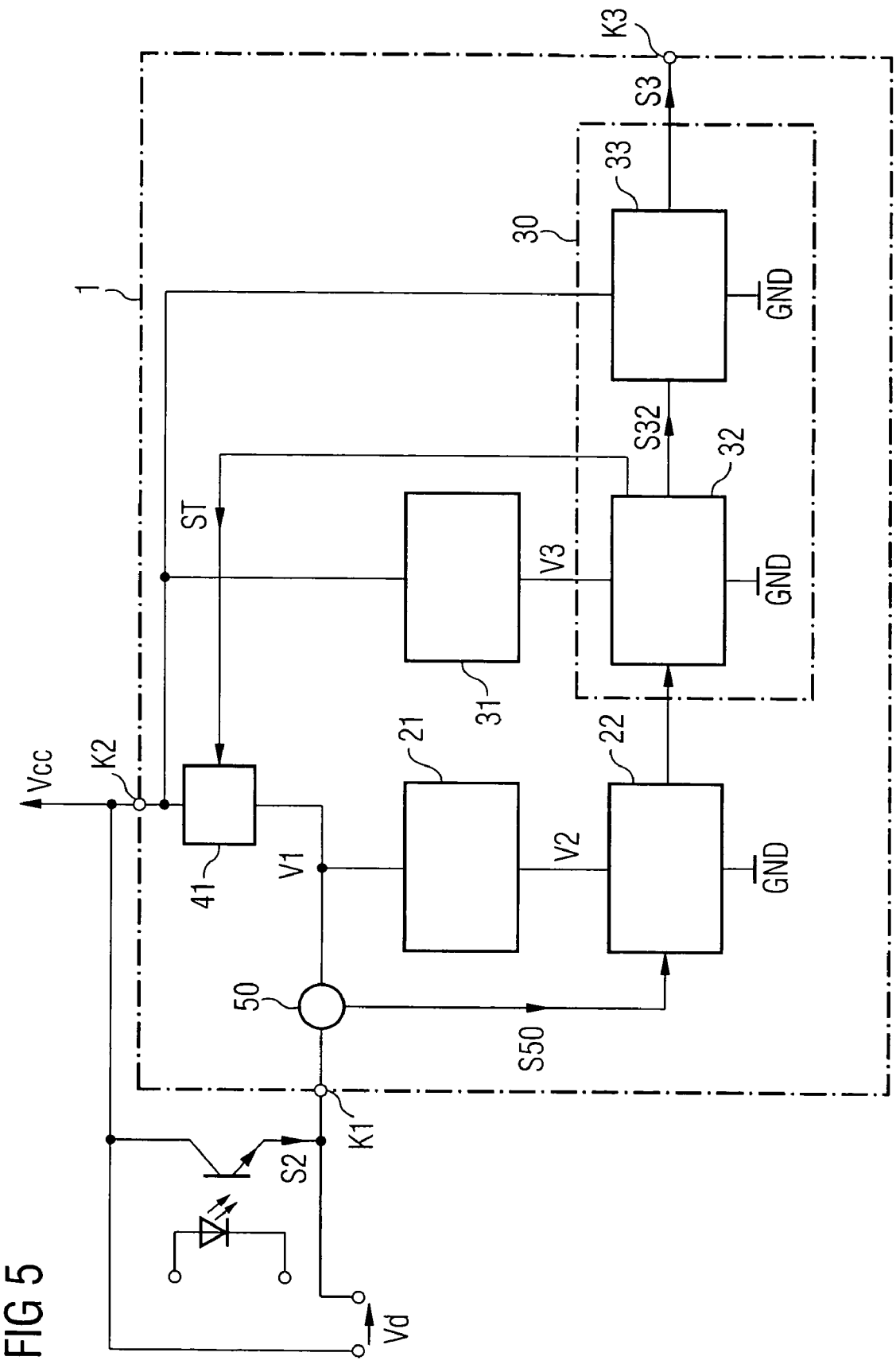
FIG. 5 shows a second exemplary embodiment of a drive circuit according to the invention.

FIG. 5 shows a further exemplary embodiment of a drive circuit according to the invention for a switch in a switched-mode power supply, this drive circuit differing from that illustrated in FIG. 2 by the fact that an adjustable first voltage regulator 41 is present, which provides the supply voltage V1 present at the internal node N1 in a manner dependent on a setting signal ST.

Figure 8:
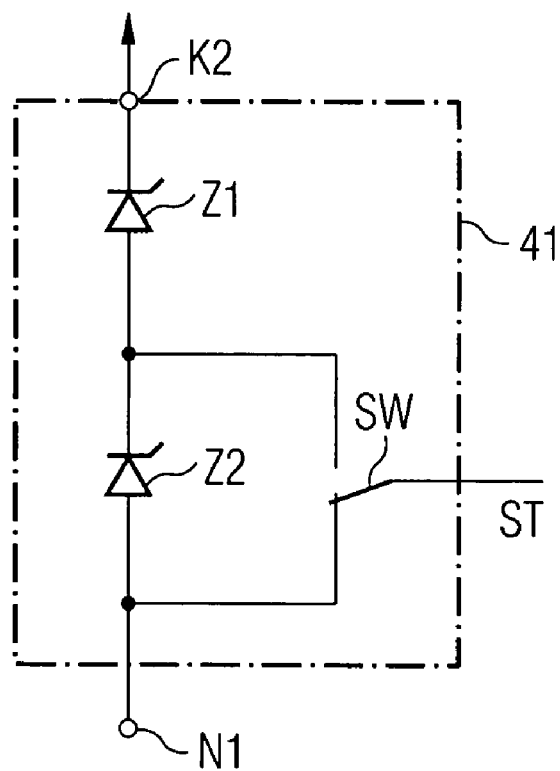
FIG. 8 shows a second exemplary embodiment of a first voltage regulator of the drive circuit.

Referring to FIG. 8, this voltage regulator 41 comprises, in the simplest case, a series circuit of two zener diodes Z1, Z2, one of which can be shortcircuited by means of a switch SW in a manner dependent on a setting signal ST. Assuming that the first voltage regulator 41 always contributes to the supply of the circuit components of the first group 22, the supply potential V1 is always dependent on the difference between the supply voltage Vcc and the voltage dropped across the voltage regulator 41, this voltage assuming a first and a second value depending on whether the second zener diode Z2 is bridged. The voltage Vd present across the first voltage regulator 41 can be tapped off between the supply terminal K2 and the input terminal K1. Variations of the supply voltage V1 depending on the setting of the voltage regulator 41 do not influence the voltage supply of the circuit components of the first group 22 owing to the interposed second voltage regulator 21, said voltage regulator 21 being designed to keep the supply voltage V2 constant over the possible fluctuation range of the supply voltage V1.

The setting of the voltage regulator 41 serves for providing information in the form of the voltage Vd between the supply terminal K2 and the input terminal K1. The setting signal used to set the voltage drop across the regulator 41 is for example a state signal which is generated in the drive circuit and specifies whether the drive circuit is in the normal mode or in the standby mode. The exemplary embodiment assumes that said state signal ST is generated by the circuit components of the second group 30. Referring to FIGS. 3 and 4, said state signal ST may be generated for example in that the duration of the drive pulses S32 is evaluated, a change to the standby mode being effected depending on the duration of said drive pulses, which is correspondingly indicated by the two-valued state signal ST.

The information with regard to the operating state of the drive circuit that can be tapped off between the supply terminal K2 and the input terminal K1 in the form of the voltage Vd may be used for example in further circuit components of a switched-mode power supply. Reference shall be made here by way of example to switched-mode power supplies which, in addition to a DC voltage converter illustrated in FIG. 1, comprise a power factor controller (PFC) which provides the DC voltage, converted into the output voltage by the DC voltage converter, from a power supply voltage. The information with regard to the operating state that is provided by the drive circuit of the DC voltage converter may be utilized for turning off the PFC in the standby mode in order thereby to reduce the power consumption of the overall circuit comprising the power factor controller and the DC voltage converter connected downstream. In this regard, it should be pointed out that the drive circuit for driving the switch in a DC voltage converter that has been explained with reference to the figures may, of course, also be an integrated drive circuit which serves both for driving a switch in a PFC and for driving the switch in a DC voltage converter connected downstream of the PFC. Such integrated drive circuits are, by way of example, drive circuits of the TDA16888 type from Infineon Technologies AG.

Figure 6:
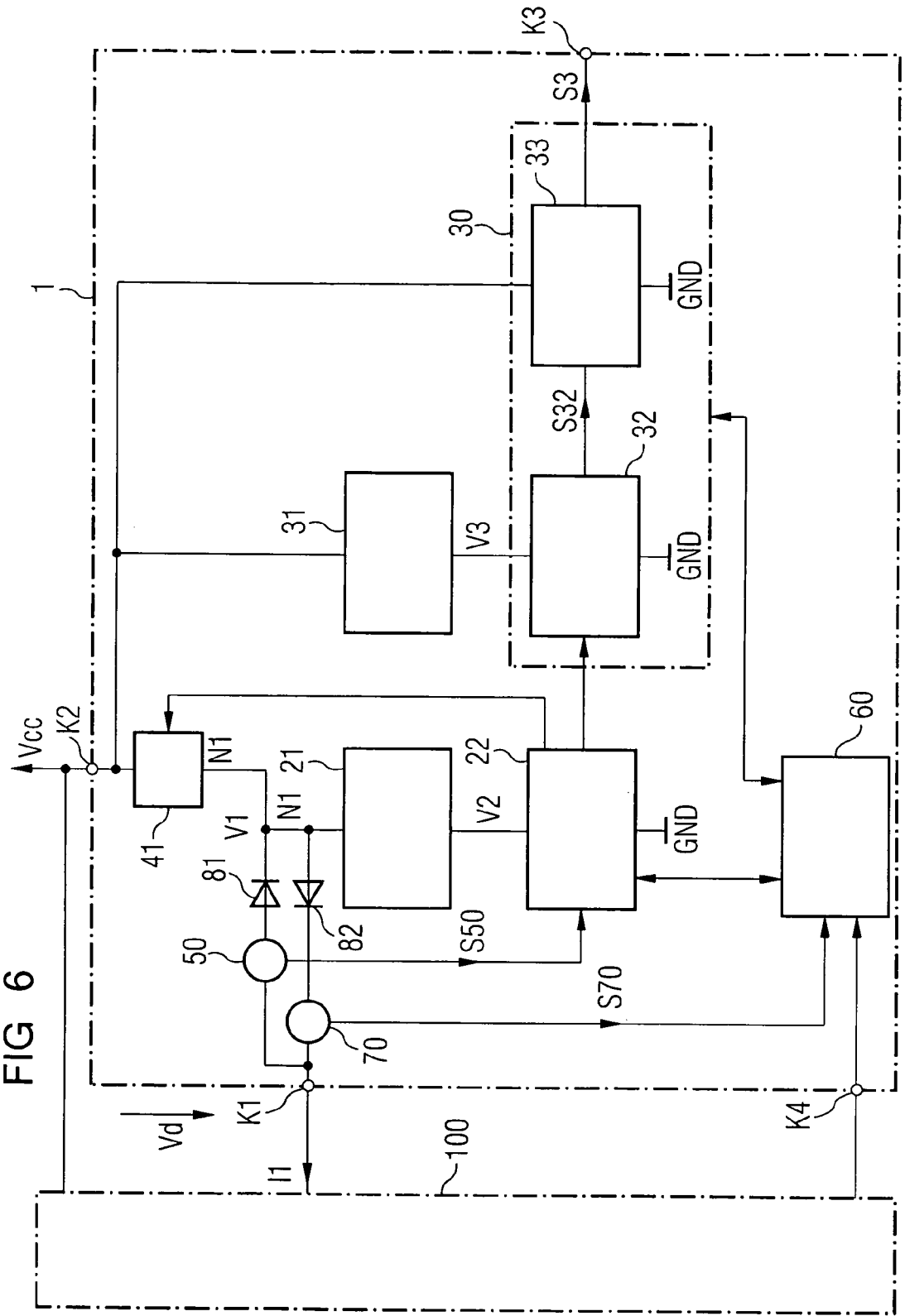
FIG. 6 shows a third exemplary embodiment of a drive circuit according to the invention.

FIG. 6 shows a further exemplary embodiment of a drive circuit according to the invention, which differs from the drive circuits in accordance with FIGS. 2 and 5 by the fact that a test circuit 60 for testing circuit components present in the drive circuit is provided. The possibility for testing said circuit components is illustrated schematically in FIG. 6 in that signal inputs and outputs of the test circuit 60 are connected to the circuit components of the first and second groups 22, 30. FIG. 6 shows the drive circuit 60 in the test mode, in which an external circuit 100 that generates test patterns, for example, is connected to the supply terminal K2, the input terminal K1 and to a further terminal K4 connected to the internal test circuit 60.

The test circuit 60 is fed a two-valued signal via the input terminal K1 from the external test circuit 100. For this purpose, a current Ii is impressed on the input terminal K1 by the external test circuit 100, the current direction of said current being opposite to the current direction of a current which is generated when the control signal (S2 in FIGS. 2 and 5) is present. In order to detect this negative current I1, a second current measuring unit 70 is connected to the input terminal K1 and generates a signal S70 which is dependent on said input current I1, which can assume two different amplitudes, said signal S70 being fed to the test circuit 60. In order, outside the test mode, to prevent a signal from being fed to the test circuit 60 via the current measuring arrangement 70, a rectifier element 82 designed as a diode is connected in series with the current measuring arrangement 70, which is coupled between the input terminal K1 and the voltage supply node N1. Correspondingly, in this exemplary embodiment, a rectifier element 81, which is designed as a diode and is connected oppositely to the rectifier element 82, is connected in series with the first current measuring arrangement 50 in order to prevent a signal S50 that is fed to the first group 22 of circuit components from being generated by the current measuring arrangement 50 during the test mode.

Tests of selected circuit components are carried out by the test circuit 60 depending on the signal S60 fed to the test circuit 60. In the exemplary embodiment, the test results are output with the aid of an adjustable voltage regulator 41, which is driven by the test circuit 60, so that, depending on the drive signal supplied by the test circuit 60, a first or a second voltage Vd is present between the supply terminal K2 and the input terminal K1 in the test mode, said voltage representing test information supplied by the test circuit.

The information fed to the test circuit 60 via the input K1 and the information which is supplied by the test circuit and output via the terminals K1, K2 can be coded in an arbitrary conventional manner. During the test mode, it is possible, for example, firstly to feed test signals to the test circuit 60 and then to switch the external test circuit 11 over "to receive" in order to receive the results supplied by the test circuit 60 via the terminals K1, K2.

The possibility of outputting information from the test circuit via the terminals K1, K2 is not restricted to binary signals. By suitable embodiment of the first voltage regulator 41, the latter is also suitable for outputting analog signals. If, in the course of the test, known reference voltages are output via the test circuit 60, the voltage regulator 41 and the terminals K1, K2, then it is possible to use the voltage values measured in this case at the terminals K1, K2 for calibrating all further measurements.

In the exemplary embodiment, the drive circuit has a further connecting terminal K4, which, during operation of the drive circuit in a switched-mode power supply, is provided for example for receiving a signal which indicates the demagnetization of the transformer. In the exemplary embodiment, the connecting terminal K4, in the drive circuit, is likewise connected to the test circuit 60 and is externally connected to the external test circuit 100. In the test mode, by way of example, a clock signal which serves for synchronizing the binary signal transmitted via the terminal K1 can be transmitted via the connecting terminal K4. In the case of the drive circuit in accordance with FIG. 6, a test of the drive circuit is possible without requiring separate inputs and outputs for feeding test signals, which minimizes the production costs of the drive circuit, in particular with regard to the housing costs that rise with the number of terminals.

| List of reference symbols | |
|---|---|
| AK1, AK2 | Output terminals |
| BG | Bridge rectifier |
| C1 | Capacitor |
| Cin | Input capacitor |
| CLK | Clock signal |
| D1 | Diode |
| EK1, EK2 | Input terminals |
| GND | Reference-ground potential |
| K1 | Input terminal |
| K2 | Supply terminal |
| K3 | Output terminal |
| K4 | Connecting terminals |
| LED | Light-emitting diode |
| Lp | Primary coil |
| Ls | Secondary coil |
| N1 | Voltage supply node |
| PT | Phototransistor |
| S1, S2 | Control signals |
| S221 | Operational amplifier output signal |
| S222 | Comparator output signal |
| S224 | Sawtooth signal |
| S225 | Voltage divider signal |
| S3 | Drive signal |
| S32 | Pulse-width-modulated signal |
| S50, S70 | Current measurement signals |
| ST | Setting signal |
| SW | Switch |
| T | Semiconductor switch, MOSFET |
| TR | Trans former |
| Uin | Input voltage of the DC voltage converter |
| Un | Power supply voltage |
| Uout | Output voltage |
| V1, V2, V3 | Supply voltages |

| List of reference symbols -continued | |
|---|---|
| Vcc | Supply voltage |
| Vref | Reference voltage |
| Z | Load |
| Z1, Z2 | Zener diodes |
| 10 | Controller |
| 11 | Optocoupler |
| 12 | Drive circuit |
| 21 | Second voltage regulator |
| 22 | Circuit components of a first group |
| 30 | Circuit components of a second group |
| 31 | Third voltage regulator |
| 32 | Components of the second group |
| 33 | Components of the second group, driver circuit |
| 60 | Test circuit |
| 40, 41 | First voltage regulator |
| 100 | External test circuit |
| 50, 70 | Current measuring arrangements |
| 81, 82 | Rectifier elements, diodes |
| 220 | Reference voltage source |
| 221 | Operational amplifier |
| 222 | Comparator |
| 223 | Clock generator |
| 224 | Sawtooth generator |
| 225 | Voltage divider |
| 320 | RS flip-flop |

The invention claimed is:

1. A drive circuit for generating a drive signal for a switch in a switching converter dependent on a control signal, the switching converter configured to generate a rectified switching converter output voltage, the drive circuit comprising:
a first input terminal configured to receive the control signal, the control signal being generated dependent on the rectified switching converter output voltage;
a supply terminal configured to receive a supply voltage;
a first set of circuit components and a second set of circuit components collectively operable to generate the drive signal based on the control signal and using bias voltages, the first set of circuit components operably connected to receive a first supply voltage derived at least in part from the control signal, the second set of circuit components operably connected to receive a second supply voltage derived substantially only from the supply voltage, the set of circuit components further operably connected such that the first supply voltage is also derived in part from the supply voltage at least some time;
a first voltage regulator coupled between the supply terminal and the input terminal, wherein the first voltage regulator is adjustable and provides an output potential based at least in part on a setting signal.

2. The drive circuit as claimed in claim 1, wherein the first set of circuit components includes analog circuit components.

3. The drive circuit as claimed in claim 2, in which the analog circuit components comprise at least one of the following components: a reference voltage generator, a signal generator, a comparator, a operational amplifier or a voltage divider.

4. The drive circuit as claimed in claim 1, wherein the second set of components includes digital circuit components.

5. The drive circuit as claimed in claim 4, in which the digital circuit components comprise at least one of the following components: a flip-flop or a logic gate.

6. The drive circuit as claimed in claim 1, wherein the drive circuit has a first operating state and a second operating state, the setting signal having at least one characteristic corresponding to a current operating state of the drive circuit.

7. The drive circuit as claimed in claim 1, further comprising a test circuit coupled to the first input terminal and at least one of the group consisting of the first set of circuit components and the second set of circuit components.

8. The drive circuit as claimed in claim 7, wherein the test circuit is operable to generate the setting signal.

* * * * *